United States Patent [19]

Wakai et al.

[11] Patent Number: 4,752,427
[45] Date of Patent: Jun. 21, 1988

[54] METHOD FOR PLASTIC WORKING OF CERAMICS

[75] Inventors: Fumihiro Wakai; Shuji Sakaguchi, both of Nagoya; Hiroshi Ohnishi, Osaka; Hiroshi Tomatsu, Sakai, all of Japan

[73] Assignees: Agency of Industrial Science and Technology, Tokyo; Nippon Kagaku Togyo Co., Ltd., Sakai, both of Japan

[21] Appl. No.: 884,336

[22] Filed: Jul. 11, 1986

[30] Foreign Application Priority Data

Jul. 12, 1985 [JP] Japan ................. 60-154438

[51] Int. Cl.$^4$ ............................................. C04B 35/48
[52] U.S. Cl. ....................................... 264/60; 264/66; 264/332
[58] Field of Search ........................... 264/66, 332, 60; 501/103

[56] References Cited

U.S. PATENT DOCUMENTS 4,344,904  8/1982  Yamada et al. ................. 501/103

OTHER PUBLICATIONS

The Japan Economic Journal, 7/23/85, p. 16.
Journal of The American Ceramic Society, vol. 63, No. 7-8, (1980), pp. 368-375, by A. G. Evans et al., published on Jul. 1, 1980.
Journal of The American Ceramic Society, vol. 68, No. 10, (1985), pp. 522-529, by P. C. Panda et al., published on Oct. 1, 1985.
FC Report, vol. 4, No. 2, (1986), pp. 1-6, by F. Wakai et al., published on Feb. 25, 1986.
Nikkei New Materials, Feb. 3, 1986 issue, pp. 18-19.
Advanced Ceramic Materials, vol. 1, No. 3, (1986), pp. 259-263, by F. Wakai et al., published Jul. 1, 1986.

*Primary Examiner*—James Derrington
*Attorney, Agent, or Firm*—Armstrong, Nikaido, Marmelstein & Kubovcik

[57] ABSTRACT

A method for plastic working of ceramics comprising the steps of causing a sintered or pre-sintered body of polycrystalline ceramics containing at 20° C. tetragonal-phase zirconia crystals to undergo plastic deformation at a temperature of about 1,000° C. to about 1,600° C. and then heating the ceramics body at a temperature of about 1,300° C. to about 1,650° C.

9 Claims, No Drawings

METHOD FOR PLASTIC WORKING OF CERAMICS

This invention relates to a method for plastic working of ceramics, and more particularly to a method for plastic working of ceramics with a high precision without reducing the strength of ceramics.

Shaped bodies of polycrystalline ceramics, particularly high-performance ceramics useful for machine parts or the like, are required, for use, to have the properties of being processed into bodies as variable in shape as products of metallic materials and as high as or higher than those of metallic materials in dimensional precision.

Generally ceramics greatly shrink during sintering in the producing process, and the shrinkage is sensitive to the density and temperature distribution of green compact. Accordingly ceramics, which are in the form of sintered bodies, have the drawback of tending to have portions irregularly shrunk, resulting in impairment of dimensional precision.

With this drawback, ceramics are finish-machined by a grinder with abrasive grains of diamond or like means after sintering into bodies having the desired shape and dimensions. However, usually ceramics are too difficult to machine and too brittle to process. Thus ceramics can not be easily worked into bodies having detailed or complicated shapes and have the defect of involving high working costs.

It is an object of this invention to provide a method for working ceramics into bodies having widely variable shapes by a simple procedure.

It is another object of the invention to provide a method for working ceramics into bodies with a high dimensional precision.

It is a further object of the invention to provide a method for plastic working of ceramics without reducing the strength of ceramics.

These and other objects of the invention will become more apparent from the following description.

This invention provides a method for plastic working of ceramics comprising the steps of causing polycrystalline ceramics containing at 20° C. tetragonal-phase zirconia crystals to undergo plastic deformation at a temperature of about 1,000° C. to about 1,600° C. and heating the ceramics at a temperature of about 1,300° C. to about 1,650° C.

According to this invention, the specific ceramics containing tetragonal-phase zirconia crystals at room temperature can be caused to undergo plastic deformation by application of tensile, compressive or like stress while being heated at the specific temperature, thereby enabling the processing by various shaping methods. In accordance with the invention, while the plastic deformation in this manner gives reduced strength to the ceramic shaped body, heat treatment of the body over the specific temperature range after plastic deformation can afford the body significantly improved strength even over that of the body before plastic deformation.

This invention further provides an article obtained by the foregoing method.

The ceramics to be worked by the method of the invention are polycrystalline ceramics containing tetragonal-phase zirconia crystals at 20° C.

Examples of such ceramics are sintered bodies of zirconia, sintered bodies of zirconia solid solution, composite sintered bodies of zirconia or zirconia solid solution with other crystals, etc.

Preferred examples of sintered bodies of zirconia solid solution are those containing $Y_2O_3$, MgO, CaO, $CeO_2$ or the like in the form of solid solution, namely so-called stress induced transformation toughened zirconia ceramics. The zirconia solid solution preferably has $Y_2O_3$ content of 6 mole % or less, MgO content of 12 mole % or less, CaO content of 12 mole % or less, or $CeO_2$ content of 20 mole % or less.

Examples of other crystals to be combined with zirconia or zirconia solid solution for composite sintered bodies are those which do not form any crystal of other composition on reaction with zirconia and which can be the sintered at less than about 1,650° C., i.e. sintering temperature of zirconia. Preferred examples of the crystals to be combined with zirconia or zirconia solid solution are alumina, mullite, spinel, $Si_3N_4$ and the like. The content of zirconia in the composite sintered body is preferably at least about 40% by weight, more preferably at least about 60% by weight.

The amount of tetragonal-phase zirconia crystals contained in polycrystalline ceramics to be used in the method of the invention is preferably at least 10% by volume at 20° C., more preferably at least about 20% by volume.

The ceramics to be used in this invention may be in the form of either a high-density sintered body produced by sintering nearly to the theoretical density of the ceramics or porous sintered body obtained by heat treatment at below the sintering temperature, namely presintered body.

According to the method of the invention, the polycrystalline ceramics containing tetragonal-phase zirconia crystals is caused at a temperature of about 1,000° C. to about 1,600° C., preferably about 1,200° C. to about 1,550° C. to undergo plastic deformation. The deforming temperature of below about 1,000° C. results in insufficient plastic deformation, whereas the deforming temperature of over about 1,600° C. is likely to induce marked grain growth of zirconia and to cause reaction between the ceramics and the jig of processing equipment, thereby markedly impairing the characteristics of shaped bodies, hence undesirable. The term "plastic deformation" used herein and in the appended claims refer to super plastic deformation in which the body to be processed undergoes uniform deformation and also to plastic deformation in which the body to be processed is subjected to uneven deformation.

The deforming rate in the plastic deformation of this invention varies depending on the deforming temperature, crystal grain size of ceramics, amount of tetragonal-phase zirconia crystals, working method and the like. Since the deformation is conducted at a high temperature, it is suitable that the body be subjected to deformation at a relatively high rate from economical viewpoints. The preferred deforming rate therefore is such that stress exceeding a minimum stress to cause grain boundary sliding at the grain boundary of ceramics, i.e. critical resolved shear stress, is applied. For example, when zirconia ceramics containing 70% tetragonal-phase zirconia and having a mean crystal grain size of 0.3 μm are deformed under applied tensile stress, the plastic deformation can be performed at a strain rate of about $2 \times 10^{-4}$/sec to about $6 \times 10^{-4}$/sec. Generally the deforming rate can be raised with the elevation of deforming temperature, reduction of crystal grain size and increase in content of tetragonal-phase zirconia crystals.

The amount of plastic deformation obtained by the working method of the invention is variable depending on the kind and shape of ceramics, working method, etc. The deformation under applied tensile stress, for example, can stretch the ceramics bodies to more than twice the original size.

The reason why the polycrystalline ceramics containing tetragonal-phase zirconia crystals can be made to undergo plastic deformation is presumably as follows. Since the tetragonal-phase zirconia is generally of small crystal grain size and outstanding in symmetry, plastic flow easily occurs in the grain boundary of the tetragonal-phase zirconia crystals over the aforesaid deforming temperature range, while after deformation over a low temperature range wherein the tetragonal-phase zirconia crystals are in a metastable phase, the residual stress caused by the deformation can be retained by the stress induced transformation toughening characteristics of the tetragonal-phase zirconia so that the shaped body can not be readily ruptured.

The ceramics thus worked by plastic deformation have cavities formed and grown at the grain boundary, particularly triple grain junction, due to the grain boundary sliding. The cavities are formed and grown to a greater extent than that achieved by the contraction resulting from the diffusion and flow of atoms of ceramics during the plastic deformation. Thus the cavities can be a defect or can be a source on which stress is concentrated so that even if the stress applied to the shaped body is below the inherent strength of the body, the fracture of shaped body will take place from the cavities as the starting point. The cavities can be contracted by the diffusion or flow of atoms of ceramics due to the elevation of deforming temperature or decrease of deforming rate. These means, however, are defective due to the tendency for the ceramics to adhere to or react with the jig of processing equipment. Further these means can not contract or eliminate the cavities in the case of deformation under applied tensile stress.

According to the method of this invention, the cavities formed in the shaped body are contracted or eliminated by heat treatment at a temperature of about 1,300° C. to about 1,650° C. after plastic deformation. It is desirable that the heat-treating temperature be equal to or higher than the deforming temperature, preferably between about 1,400° C. to about 1,600° C.

If the heat-treating temperature is lower than about 1,300° C., the strength can not be enhanced, whereas above about 1,650° C., substantial crystal grain growth of ceramics occurs so that the mechanical strength of the shaped body is reduced by conversion of the tetragonal-phase zirconia into monoclinic-phase zirconia after heat treatment, which is undesirable.

While the heat treatment may be effected under normal pressure, application of pressure serves to further improve the strength of shaped body and to shorten the heat-treating time. It is preferred to apply isostatic pressure capable of uniformly pressurizing the shaped body, preferably by gas pressure, advantageously to about 2 tons/cm² or less from economical viewpoints. The pressurization at as low as 10 kg/cm² can achieve the intended result, but the preferred pressure is one higher than the stress exerted for plastic deformation.

The heat-treating time can be varied according to the heat-treating temperature, composition of ceramics, amount of deformation and the like, but is usually about 1 to about 10 hours under normal pressure and about 30 minutes to about 3 hours under applied pressure.

The heat treatment can be done as a separate procedure after completion of plastic deformation or subsequently on completion without cooling.

The cavities formed during the deformation are contracted or eliminated by the diffusion or flow of atoms of ceramics resulting from the heat treatment, whereby the ceramic shaped body is made denser and the strength thereof is remarkably improved. The defects existing in the shaped body prior to plastic deformation such as large hollow voids and non-homogeneous phase are moderated or removed by compression and dispersion due to the stress exerted in the plastic deformation and by contraction brought about on subsequent heat treatment. The defects present therein prior to the plastic deformation can be further remedied by employing suitable conditions for this heat treatment. In this case, the strength of the shaped body can be made greater than the strength prior to deformation, thereby making the shaped body far more reliable.

The grain size of crystals in the ceramic shaped body has relation to the dimensions of cavities formed by plastic deformation. With greater crystal grain size, larger cavities are created, thus necessitating higher energy for contracting or eliminating the cavities by subsequent heat treatment. Accordingly the grain size of crystals in ceramic shaped body is preferably about 2 $\mu$m or less, more preferably about 1 $\mu$m or less. The grain size of about 2 $\mu$m or less is desirable also in order to increase the workability.

According to the method of the invention, ceramics can be subjected to plastic working without reducing the strength and can be worked by press, forging, extrusion, drawing or like means with a wide range of latitude. With the method of the invention, finer surface finish can be easily provided by uniformly compressing ceramics with use of a specular surface of processing means. The method of the invention therefore is also a significantly advantageous method for surface finishing of ceramic products.

As described above, the method of the invention is very advantageous for working ceramics, and can extend the use of ceramics to various applications such as machine parts and the like.

The present invention will be described below in greater detail with reference to the following Examples and Comparison Examples.

EXAMPLES 1 TO 6 AND COMPARISON EXAMPLES 1 AND 2

Tensile stress was applied at a deforming rate of 1 mm/min (strain rate of $4.6 \times 10^{-4}$/sec) at 1,450° C. to a sintered body of $ZrO_2$ (with a mean grain size of 0.3 $\mu$m, porosity of 1%, incorporating 3 mole % of $Y_2O_3$ in the form of a solid solution) containing 70% by volume of tetragonal-phase zirconia crystals and having a diameter of 2.69 mm and a length of 30 mm, whereby the sintered body was deformed into a rod 1.8 mm in diameter and 66 mm in length. The sintered body had a bending strength of 102 kgf/mm² prior to deformation and 79 kgf/mm² thereafter.

The sintered body thus deformed was heated while elevating the temperature at a rate of 150° C./hr to perform heat treatment under conditions specified below in Table 1. Then the bending strength of the body at 20° C. was measured with the results shown in Table 1 below. In Example 1, the sintered body was retained at the same temperature for 2 hours after deformation without being cooled and was cooled to 20° C. at which the bending strength of the body was measured.

TABLE 1

| | Heat-treating conditions | | | Bending strength (kgf/mm$^2$) |
|---|---|---|---|---|
| | Temperature (°C.) | Pressure (kgf/cm$^2$) | Time (hr) | |
| Ex. | | | | |
| 1 | 1,450 | Normal pressure | 2 | 83.7 |
| 2 | 1,450 | Normal pressure | 5 | 89.6 |
| 3 | 1,500 | Normal pressure | 3 | 96.5 |
| 4 | 1,580 | Normal pressure | 2 | 103.5 |
| 5 | 1,500 | 10 | 1 | 105.1 |
| 6 | 1,450 | 1,000 | 0.5 | 128.7 |
| Comp. Ex. | | | | |
| 1 | 1,280 | Normal pressure | 3 | 78.2 |
| 2 | 1,680 | Normal pressure | 2 | 25.0 |

EXAMPLES 7 TO 9 AND COMPARISON EXAMPLES 3 AND 4

Compressive stress was applied by an alumina jig at a deforming rate of 0.02 mm/min (strain rate of $5 \times 10^{-5}$/sec) at 1,280° C. in the direction of thickness to a sintered body of $ZrO_2$ (with a mean grain size of 0.2 μm, porosity of 9.2%, incorporating 2.5 mole % of $Y_2O_3$ in the form of a solid solution) composed only of tetragonal-phase zirconia crystals and having a shape of square plate measuring 10 mm×10 mm×5 mm (thickness), whereby the sintered body was deformed into a thin plate measuring 14.3 mm×14.3 mm×2.5 mm (thickness). The sintered body had a bending strength of 65.2 kgf/mm$^2$ prior to deformation and 70.5 kgf/mm$^2$ thereafter.

The sintered body thus deformed was heated while elevating the temperature at a rate of 100° C./hr to perform heat treatment under conditions specified below in Table 2. Then the bending strength and porosity of the sintered body at 20° C. were measured with the results shown also in Table 2 below.

TABLE 2

| | Heat-treating conditions | | | Bending strength (kgf/mm$^2$) | Porosity (%) |
|---|---|---|---|---|---|
| | Temperature (°C.) | Pressure (kgf/cm$^2$) | Time (hr) | | |
| Ex. | | | | | |
| 7 | 1,320 | Normal pressure | 8 | 80.5 | 6.5 |
| 8 | 1,450 | Normal pressure | 2 | 98.5 | 1.7 |
| 9 | 1,580 | Normal | 1 | 110.1 | 0.5 |
| Comp. Ex. | | | | | |
| 3 | 1,280 | Normal pressure | 2 | 71.2 | 7.5 |
| 4 | 1,680 | Normal pressure | 1 | 23.0 | 3.5 |

EXAMPLE 10

Tensile stress was applied at a deforming rate of 0.2 mm/min (strain rate of $9.5 \times 10^{-5}$/sec) at 1,450° C. to a composite sintered body comprising 80% by weight of $ZrO_3$ (0.3 μm in mean grain size, incorporating 4 mole % of $Y_2O_3$) and 20% by weight of $Al_2O_3$ (1.5 μm in mean grain size), containing 30% by volume of tetragonal-phase zirconia crystals and having a tubular shape with an outer diameter of 2.0 mm, inside diameter of 0.8 mm and length of 30 mm, whereby the shaped body was deformed into a tube 1.5 mm in outer diameter, 0.6 mm in inside diameter and 53.4 mm in length. The shaped body had a bending strength of 52.6 kgf/mm after deformation.

The shaped body thus deformed was heated while elevating the temperature at a rate of 150° C./hr to perform heat treatment at 1,500° C. under normal pressure for 3 hours. The shaped body thus heated had a bending strength of 60.7 kgf/mm$^2$ as measured at 20° C.

EXAMPLE 11

Compressive stress was applied with a jig made of SiC at a deforming rate of 0.01 mm/min (strain rate of $1.5 \times 10^{-4}$/sec) at 1,400° C. in the direction of thickness to a sintered body of $ZrO_2$ (with a mean grain size of 0.8 μm, incorporating 14 mole % of $CeO_2$ in the form of a solid solution) containing 80% by volume of tetragonal-phase zirconia crystals and having a shape of square plate measuring 10 mm×10 mm×1 mm (thickness), whereby the sintered body was deformed into a thin plate measuring 13 mm×13 mm×0.6 mm (thickness). The sintered body had a bending strength of 50.2 kgf/mm$^2$ as measured at 20° C. after deformation.

The sintered body thus deformed was heated while elevating the temperature at a rate of 200° C./hr to perform heat treatment at 1,450° C. under normal pressure for 5 hours. Then the sintered body was found to have a bending strength of 54.8 kgf/mm$^2$ as measured at 20° C.

EXAMPLE 12

Torsion stress was applied by performing three revolutions at a rate of ten revolutions per hour at 1,500° C. to a composite sintered body comprising 80% by weight of $ZrO_2$ (0.5 μm in mean grain size, incorporating 3 mole % of $Y_2O_3$ in the form of a solid solution) and 20% by weight of spinel (2 μm in mean grain size), containing 50% by volume of tetragonal-phase zirconia crystals, and having a shape of rectangular rod measuring 3 mm×3 mm×60 mm. The sintered body thus deformed was found to have a tensile strength of 42.3 kgf/mm$^2$. The sintered body was heated while elevating the temperature at rate of 150° C./hr to perform heat treatment under a pressure of 10 kgf/cm$^2$ at 1,550° C. for 30 minutes. The tensile strength of the body thus heat-treated was 58.6 kgf/mm$^2$.

EXAMPLE 13

Tensile stress was applied at a deforming rate of 0.2 mm/min at 1,550° C. to a composite sintered body comprising 45% by weight of $ZrO_2$ (0.5 μm in mean grain size, incorporating 2 mole % of $Y_2O_3$ in the form of a solid solution) and 55% by weight of mullite, containing 25% by volume of tetragonal-phase zirconia crystals, and having a shape of rectangular rod measuring 3 mm×3 mm×40 mm, whereby the sintered body was deformed into a slender rectangular rod measuring 2.5 mm×2.3 mm×68 mm. The sintered body had a tensile strength of 33.7 kgf/mm$^2$ after deformation and 46.3 kgf/mm$^2$ as measured after heat treatment at 1,620° C. under normal pressure for 3 hours.

EXAMPLE 14

Compressive stress was applied at a deforming rate of 0.1 mm/min at 1,300° C. to a composite sintered body comprising 55% by weight of $Si_3N_4$ (incorporating 3 mole % of $Y_2O_3$ and 7 mole % of $Al_2O_3$ in the form of a solid solution) and 45% by weight of $ZrO_2$, containing 25% by volume of tetragonal-phase zirconia crystals, and having a shape of rectangular rod measuring 4 mm×3 mm×40 mm, whereby the sintered body was deformed into a plate measuring 5 mm×2.2 mm×43.5 mm. The sintered body had a bending strength of 67.2 kgf/mm² after deformation and 83.6 kgf/mm² after heat treatment at 1,650° C. under a pressure of 1 ton/cm² by argon gas for 2 hours.

We claim:

1. A method for plastic working of ceramics comprising the steps of causing a sintered or pre-sintered body of polycrystalline ceramics to undergo plastic deformation at a temperature of about 1,000° C. to about 1,600° C. and then after plastic deformation, heat-treating the ceramics body at a temperature of about 1,300° C. to about 1,650° C., wherein said sintered or pre-sintered body of polycrystalline ceramics contains tetragonal phase zirconia crystals at 20° C.

2. A method according to claim 1 wherein the body of polycrystalline ceramics is a sintered body of zirconia, a sintered body of zirconia solid solution or a composite sintered body of zirconia or zirconia solid solution with other crystals.

3. A method according to claim 1 wherein the body of polycrystalline ceramics is a sintered body of zirconia solid solution containing at least one of $Y_2O_3$, MgO, CaO and $CeO_2$.

4. A method according to claim 1 wherein the body of polycrystalline ceramics is a composite sintered body of at least one of alumina, mullite, spinel and $Si_3N_4$ with zirconia or zirconia solid solution.

5. A method according to claim 4 wherein the zirconia solid solution contains at least one of $Y_2O_3$, MgO, CaO and $CeO_2$.

6. A method according to claim 1 wherein the body of polycrystalline ceramics contains at least about 10% by volume of tetragonal-phase zirconia crystal at 20° C.

7. A method according to claim 1 wherein after undergoing plastic deformation, the ceramics body is heated under normal pressure or applied pressure.

8. A method according to claim 1 wherein the body of polycrystalline ceramics is caused to undergo plastic deformation at a temperature of about 1,200° C. to about 1,550° C.

9. A method according to claim 1 wherein after undergoing plastic deformation, the ceramics body is heated at a temperature of about 1,400° C. to about 1,600° C.

* * * * *